United States Patent [19]

Auxier et al.

[11] Patent Number: 5,131,222
[45] Date of Patent: Jul. 21, 1992

[54] THERMALLY VALVED COOLING SYSTEM FOR EXHAUST NOZZLE SYSTEMS

[75] Inventors: Thomas A. Auxier; Anthony M. Zimmerman, both of Palm Beach Gardens, Fla.

[73] Assignee: The United States of Americas as represented by the Secretary of the Air Force, Washington, D.C.

[21] Appl. No.: 621,695

[22] Filed: Nov. 28, 1990

[51] Int. Cl.⁵ .................................................. F02K 1/82
[52] U.S. Cl. ............................................ 60/204; 60/266
[58] Field of Search ................ 60/261, 266, 754, 204

[56] References Cited

U.S. PATENT DOCUMENTS

| | | | |
|---|---|---|---|
| 2,874,536 | 2/1959 | Benson et al. | 60/261 |
| 4,422,300 | 12/1983 | Dierberger et al. | 60/754 |
| 4,747,542 | 5/1988 | Cires et al. | 60/266 |
| 4,747,543 | 5/1988 | Madden | 60/266 |

Primary Examiner—Louis J. Casaregola
Attorney, Agent, or Firm—Robert L. Nathans; Donald J. Singer

[57] ABSTRACT

Flow rate of coolant air is increased upon elevated nozzle gas temperatures to increase nozzle liner cooling effect. A hot side curved plate is superposed over a cold side curved plate which overlays a pressurized cooling air cavity. First and second sets of apertures are formed through the first and second plates respectively. At low temperature operation, the gap between the plates is small and the staggering of the apertures restricts the flow rate of cooling gas through the plates. As temperatures rise, the hot side plate thermally expands and the gap between the plates increases to reduce the mechanical impedance effect of the staggering and to thus increase coolant flow rates.

1 Claim, 1 Drawing Sheet

THERMALLY VALVED COOLING SYSTEM FOR EXHAUST NOZZLE SYSTEMS

STATEMENT OF GOVERNMENT INTEREST

The invention described herein may be manufactured and used by or for the Government for governmental purposes without the payment of any royalty thereon.

BACKGROUND OF THE INVENTION

The present invention relates to the field of exhaust nozzle cooling devices.

A two dimensional exhaust nozzle system has large gas areas that require extensive liner cooling during afterburner (A/B) operation since the gas temperature can be as high as 4200 degrees F. However, during non-A/B operation, liner cooling is not required because of the much lower gas temperature of only 1000 degrees F.

Such a two dimensional nozzle utilizes substantially rectangular wall panels as illustrated on page 25 of "Aviation Week and Space Technology"/Sep. 24, 1990. The illustrated two dimensional YF119 nozzle is used on the Northrop YF23A advanced tactical fighter.

BRIEF SUMMARY OF THE INVENTION

It is an object of the present invention to provide a simple design for reducing nozzle air coolant flow during non-A/B operation, and then increasing the coolant flow during A/B operation to the proper design flow and/or cooling efficiency.

A first cold side curved plate having a first set of apertures is mounted over a pressurized source of cooling air, and a second hot side curved plate having a second set of apertures is positioned over the first plate. During non-A/B operation, the gap between the plates is small and since the first and second sets of apertures are staggered relative to each other, the air coolant flow rate through the plates is low. When the nozzle gas temperature rises during A/B operation, the second hot side plate separates from the first cold side plate and the air coolant flow rate increases substantially.

BRIEF DESCRIPTION OF THE DRAWINGS

Other objects, features and advantages of the invention will become apparent upon study of the following description, taken in conjunction with the drawings in which.

SPECIFIC DESCRIPTION

Figure 2:
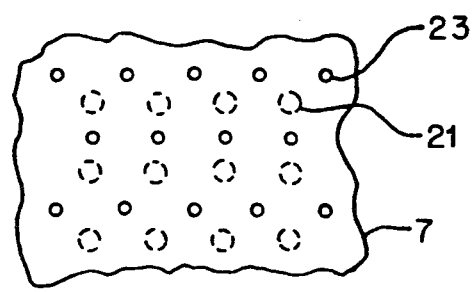
FIG. 2 is a partial plan view showing the aforesaid staggered apertures.
Figure 1:
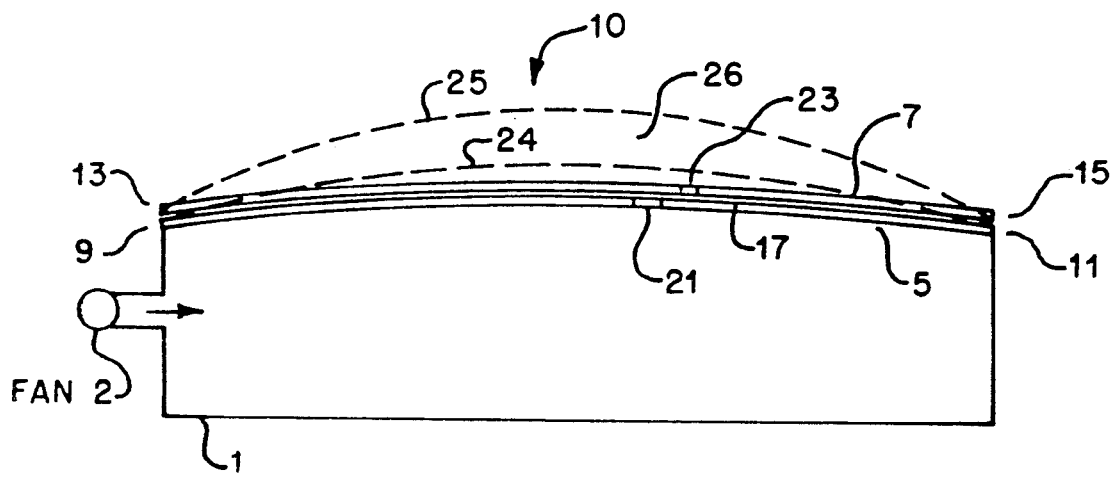
FIG. 1 is a front view of a preferred embodiment of the invention.

A source of pressurized cooling air comprises pressurized cavity 1 coupled directly or indirectly to a source of cooling air which could, for example, comprise fan 2. A first curved plate 5 overlays cavity 1 and a second curved plate 7 overlays the first curved plate. The plates may be mounted to mechanical ground in numerous ways. For example anchor means 9 and 11 could be welded or otherwise affixed to edge portions of curved plate 5, and anchor means 13 and 15 could be affixed to edge portions of the hot side curved plate 7. The upper surface of plate 7 faces the nozzle interior 10 containing hot gasses and thus plate 7 is designated as the hot side plate. During low nozzle gas temperature operation, the gap 17 between the curved plates is small and since the first set of impingement holes or apertures 21 in the cold side plate 5 are offset relative to the second set of multi-film holes or apertures 23 in the hot side plate 7, gas flow through the apertured plates will be relatively low.

As the gas nozzle temperature rises substantially at the start of A/B operation, the hot side plate 7 will experience a greater degree of thermal expansion or growth relative to the cold side plate 5 and thus the ga will increase substantially as indicated by the dotted lines 24 and 25. At this time the enhanced gap size at 26 reduces the mechanical impedance effect of the staggering of the two sets of holes, and accordingly, the cooling air flow rate will substantially increase to accomplish the aforesaid object of the invention.

The lateral offsetting or staggering of the two sets of holes is illustrated in the plan view of a portion of the curved plates; see FIG. 2. As the gas temperature in the nozzle drops sharply during non-A/B operation, the hot side curved plate contracts to decrease the gap size substantially to increase the mechanical impedance effect and thus reduce the cooling gas flow rate.

While there has been described what is at present considered to be the preferred embodiments of this invention, it will be obvious to those skilled in the art that various changes and modifications may be made therein without departing from the invention and it is, therefore, intended in the fall within the true spirit and scope of the invention, including art recognized equivalents.

What is claimed is:

1. A method of substantially increasing the flow rate of cooling air flowing through an exhaust nozzle liner at the start of afterburner operation comprising the steps of:

(a) providing a thermal valve cooling device for said exhaust nozzle having a first cold side curved plate means coupled to a pressurized source of cooling air, and having a second overlaying hot side curved plate means coupled to said first cold side curved plate means in a manner to produce a substantial increase in the gap therebetween in response to exposure of said second hot side plate means to the extremely high temperatures within said nozzle upon operation of said afterburner, said first plate means having a first set of cooling gas conducting apertures therethrough and said second plate means having a second set of cooling gas conducting apertures therethrough offset with respect to the first set of cooling gas conducting apertures; and (b) exposing said second hot side curved plate means to the elevated temperatures produced by afterburner operation to produce said substantial increase in said gap to a sufficient extent to substantially increase the flow rate of said cooling air therethrough.

* * * * *